United States Patent [19]

Arakawa

[11] 4,073,857
[45] Feb. 14, 1978

[54] DEEP-DRAWING OF A MONOAXIALLY ORIENTED, HEAT RELAXED POLYESTER FILM

[75] Inventor: Tamio Arakawa, Hino, Japan

[73] Assignee: Teijin Limited, Osaka, Japan

[21] Appl. No.: 613,741

[22] Filed: Sept. 16, 1975

Related U.S. Application Data

[63] Continuation-in-part of Ser. No. 504,747, Sept. 10, 1974, abandoned.

[51] Int. Cl.$^2$ .................. B29C 17/03; C08G 63/12
[52] U.S. Cl. .................. 264/291; 260/75 T; 264/92; 264/292
[58] Field of Search ............ 264/92, 292, 288, 210 R; 260/75 T

[56] References Cited

U.S. PATENT DOCUMENTS

| | | | |
|---|---|---|---|
| 2,444,420 | 7/1948 | Borkland | 264/292 |
| 3,429,854 | 2/1969 | Siggel et al. | 264/292 |
| 3,496,143 | 2/1970 | Siggel et al. | 264/92 |
| 3,577,510 | 5/1971 | Schmitz et al. | 264/92 |
| 3,662,049 | 5/1972 | Gilbert | 264/89 |

FOREIGN PATENT DOCUMENTS 825,549  12/1959  United Kingdom.

Primary Examiner—James B. Lowe
Attorney, Agent, or Firm—Sherman & Shalloway

[57] ABSTRACT

Process for producing a polyester shaped article by deep-drawing using a mold from a monoaxially oriented, post-heat treated polyester film which has the following properties of (i) – (iv): (i) the through view pattern of wide angle X-ray diffraction of the film is diffuse halo, (ii) when the film is heated, while maintained at a fixed width and length, from room temperature to 160° C. at a rate of 10° C./min., and then at 160° C. for 30 minutes, the azimuthal scan of (100) diffraction in the film's through view pattern shows four peaks, and, when measured with the monoaxially oriented direction of the film being caused to correspond with the meridian of said pattern, two pairs of the above peaks confronting each other across the equator, as each connected by the straight lines passing through the center of said pattern, form a central angle ($\theta$) including the equator line of at least 35° but less than 180°, (iii) when the film is dipped in hot water at 90° C. for 10 seconds, the shrinkage in the monoaxially oriented direction is not more than 25% based on the original length of the film before the dipping, and (iv) the film has a density of not more than 1.340 g/ml at 25° C.

2 Claims, 6 Drawing Figures

A: EVACUATING HOLE
( 1mm$^\phi$ )

A: EVACUATING HOLE (1mm⌀)

DEEP-DRAWING OF A MONOAXIALLY ORIENTED, HEAT RELAXED POLYESTER FILM

This is a continuation-in-part application of Ser. No. 504,747 filed on Sept. 10, 1974, and now abandoned.

This invention relates to a process for producing a polyester article from a monoaxially oriented, post-heat treated polyester film which is very unique in that it exhibits not only the favorable properties of low oriented, amorphous polyester films such as the ease of thermoforming, particularly superior thermoforming processibility, high transparency and excellent mechanical properties of shaped articles made of the film, but also is free from the inherent deficiency of said amorphous polyester film such as inferior dimensional stability at elevated temperatures.

According to the process of this invention, a slightly monoaxially oriented post-heat treated polyester film having the properties (i) to (iv) to be described is heated to a temperature above its glass transition point but below 170° C., and deep-drawn using a mold. The temperature of the mold is at least 10° C. higher than the temperature of the heated polyester film but below 200° C. The polyester film used in the present invention has superior thermoforming processability and the property of crystallizing rapidly without losing transparency upon contact with the heated mold when heated to a temperature above its glass transition point but below 170° C.

The monoaxially oriented, post-heat treated polyester film used in this invention is characterized in that i. its through view pattern of the wide angle X-ray diffraction is diffuse halo, ii. when the film is heated, while maintained at a fixed width and length, from room temperature to 160° C. at a rate of 10° C./min, and then at 160° C. for 30 minutes, the azimuthal scan of (100) diffraction in the film's through view pattern shows four peaks, and, when measured with the monoaxially oriented direction of the film being caused to correspond with the meridian direction of said pattern, two pairs of the above peaks confronting each other across the equator line, connected by straight lines passing through the center of said pattern, form a central angle ($\theta$) of at least 35° but less than 180° C. including the equator line, iii. when the film is dipped without applying tension in hot water at 90° C for 10 seconds, the shrinkage in the monoaxially oriented direction is not more than 25% based on the original length of the film before the dipping, and iv. that the film has a density of not more than 1.340 g/ml at 25° C.

When a polyester is heated and melted, extruded into a film form, and quenched, substantially amorphous and low oriented polyester films showing almost no molecular orientation are obtained. Such amorphous films are easy to thermoform, and the resulting shaped articles are known to have good transparency and excellent mechanical properties. Utilizing such favorable properties of the low oriented, amorphous polyester film, various disposable containers for foods and other goods are made. As an example, German Pat. No. 2,125,978 discloses the preparation of polyester shaped articles by vacuum forming, in which an unoriented, amorphous polyester film is heated and softened, and the softened film is shaped into the form conforming to a mold cavity under differential pressures.

Although such a polyester film can be easily thermoformed to provide shaped articles having superior transparency and mechanical properties, the shaped articles concurrently possess the inherent drawback that they are easily softened and deformed at a temperature around the glass transition point (about 75° C. for polyethylene terephthalate), thus showing poor dimensional stability at elevated temperatures. With a view to eliminating this drawback, U.S. Pat. No. 3,496,143 (Japanese Patent Publication No. 5108/69) discloses that a vacuum-formed polyester article prepared by deep-drawing a substantially unoriented polyester film having a degree of crystallization of at least 5% and up to about 25% using a mold is further heat-treated at 140° to 220° C. in a shaping mold. However, when the thermoformed article made from such an unoriented low crystallized polyester film is further crystallized by heating in the above-mentioned manner, its transparency is lost upon the formation of spherulites. In other words, the article becomes opaque and brittle, and the deterioration of the thermoforming processability cannot be avoided. Furthermore, the polyester film having a degree of crystallization of at least 5% as used in this prior art process does not possess the characteristic feature (ii) mentioned above.

U.S. Pat. No. 3,547,891 discloses a technique of stretching a polyester film at least in one direction at a low stretch ratio of, say, 1.02 to 1.25 times, in order to prevent the occurrence of blush marks and wrinkles in the shaped articles. With such a film the thermoforming processibility is not markedly impaired, but the spherulite formation and mechanical degrading of the shaped articles under heating cannot be essentially avoided. Furthermore, British patent specification No. 1,173,940 (corresponding to U.S. Pat. No. 3,577,510) discloses a method which comprises stretching a substantially amorphous polyester film in two orthogonal directions to reduce the film thickness to one-fourth to one-ninth of the original thickness, and then thermally shrinking the stretched film at 120° – 140° C. to a thickness greater than that after the stretching but not more than twice the thickness after the stretching. The film produced still shows a considerable degree of orientation, and consequently, poor thermoforming processibility. In addition, the biaxially oriented film used in this patent does not possess the characteristic feature (ii) of the monoaxially stretched post-heat treated polyester film in accordance with this invention.

We have now found that a polyester shaped article having good thermoforming processability and superior transparency and mechanical properties can be prepared by heating a polyester film having the properties (i) to (iv) mentioned above to a temperature above its glass transition point but below 170° C., and deep-drawing it using a mold heated to a temperature at least 10° C. higher than the temperature of the heated polyester film but below 200° C.

Accordingly, an object of the invention is to provide a process for producing a polyester shaped article from a polyester film having the unique characteristics (i) – (iv).

Other objects and advantages of the invention will become clearer from the following description and attached drawings, in which.

That the through view pattern of the wide angle X-ray diffraction of the monoaxially oriented, post-heat treated polyester film of this invention is diffuse halo [property (i)] means that the film is substantially amorphous and not highly oriented. A typical example of the pattern is shown in FIG. 1.

Also, when the film is heated, while maintained at a fixed width and length, from room temperature to 160° C. at a rate of 10° C./min., and then at 160° C. for 30 minutes, the azimuthal scan of (100) diffraction in the film's through view pattern shows four peaks, and, when measured with the monoaxially oriented direction of the film being caused to correspond with the direction of the meridian of said pattern, two pairs of the above peaks confronting each other across the equator, as each connected by the straight lines passing through the center of said pattern, form a central angle ($\theta$) including the equator line of at least 35° but less than 180° C [property (ii)]. The particularly preferred central angle ($\theta$) of the monoaxially oriented, post-heat treated polyester film of the invention ranges from approximately 40° to approximately 150°.

Figure 1:
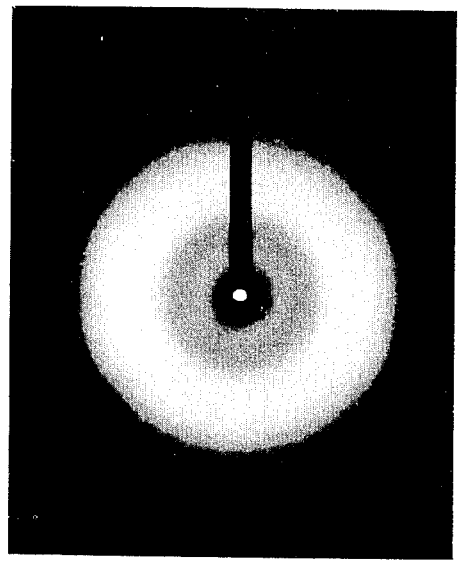
FIG. 1 is a photograph showing a typical through view pattern of the wide angle X-ray diffraction of a monoaxially oriented, post-heat treated polyester film used in the present invention.
Figure 2A:
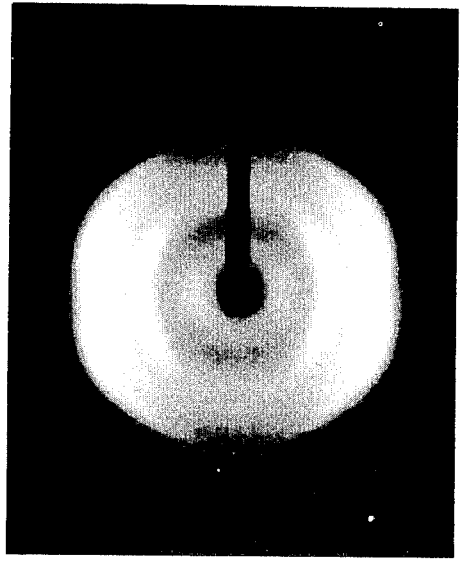
FIG. 2A is a photograph of the diffraction pattern according to the property (ii) as defined herein.
Figure 2B:
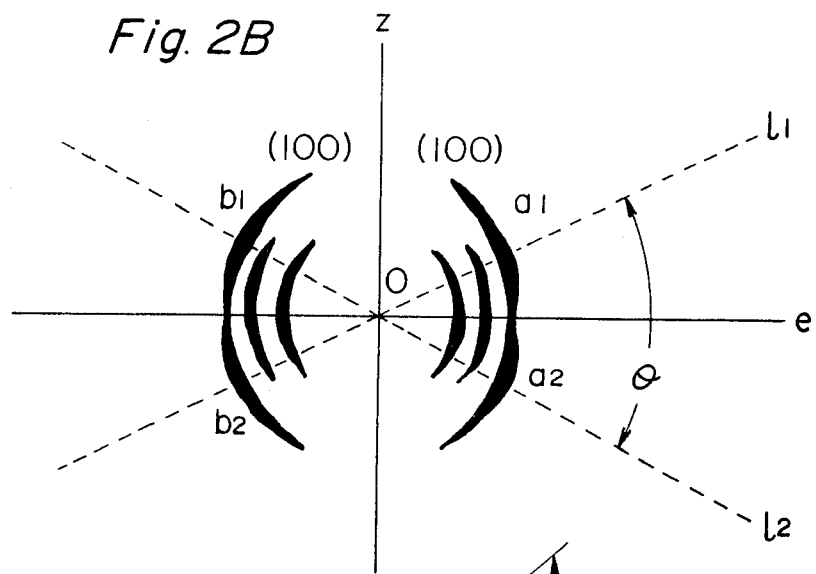
FIG. 2B is a schematic view of the diffraction pattern shown in FIG. 2A.

FIG. 2A shows the diffraction pattern demonstrating the property (ii) of the sample which gave the pattern shown in FIG. 1. FIG. 2B is a schematic view of the diffraction pattern in FIG. 2A, in which the diffraction intensity is shown in proportion to the width of the diffraction pattern. Referring to FIG. 2B, $a_1$, $a_2$, and $b_1$, $b_2$ are the two pairs of the peaks respectively confronting each other across the equator $e$ (four peaks in total). In the same figure, the central angle ($\theta$) including the equator line $e$ formed by the straight lines $l_1$ and $l_2$ connecting the each pair and passing through the center O of the diffraction pattern is approximately 60°. The central angle ($\theta$) can be roughly determined from the diffraction photographs, but the precise angle can be determined through the following procedures. The film is set orthogonally to the X-ray projected through a nozzle of 2 mm in diameter, and the counter receiving slit is moved along the straight line $l_1$ or $l_2$ of FIG. 2B. Thus the diffraction angle which gives the maximum (100) diffraction can be determined. Then the diffraction angle is fixed at the position to derive such maximum value, and the sample film fixed to a rotatable sample holder is rotated within the plane perpendicular to the incident X-ray beam, around the X-ray beam serving as the central axis. Thus an azimuthal scanning diagram is obtained, and from the angle between the maximum values in the diagram, the central angle $\theta$ can be precisely determined.

The substantially unoriented, amorphous polyester film which has been monoaxially stretched at 70° to 85° C. to about 1.5 times and post-heat treated without allowing shrinkage shows the presence of peaks satisfying the above requirement (ii). However, the film fails to satisfy the requirement (iii), that is, it has a shrinkage far greater than 25% under the specified conditions.

Figure 3:
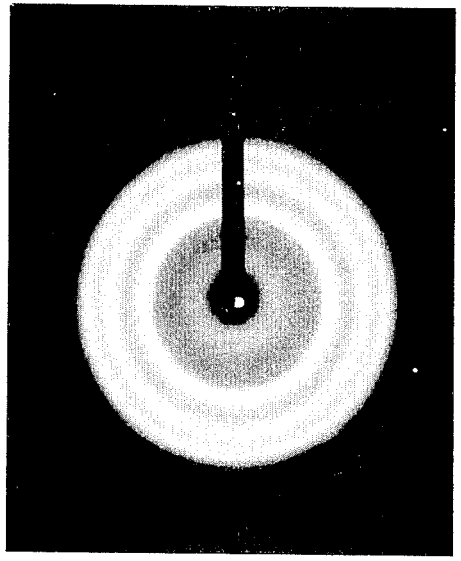
FIG. 3 shows a diffraction pattern of an unoriented, amorphous polyester outside the scope of the present application.

A film having a density at 25° C. of 1.340 obtained by merely heating a substantially unoriented, amorphous polyester film having a density at 25° C. of 1.335 without monoaxially stretching it fails to meet the above-mentioned requirement (ii), as shown in FIG. 3.

Figure 4:
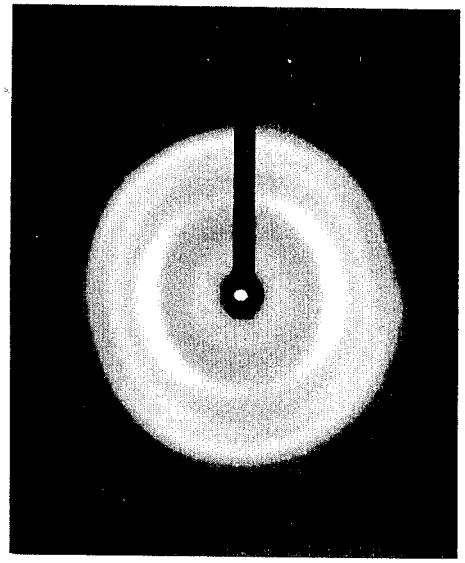
FIG. 4 shows a diffraction pattern of a different polyester film outside the scope of the present application.

Furthermore, a film obtained by stretching a polyester film to 2.3 times in the machine direction and to 2.0 times in the transverse direction to orient it in orthogonal directions (the reduction in film thickness 1/4.6), and post-heat treating it so that its thickness becomes 1.96 times the thickness of the oriented film, thereby to allow a restricted shrinkage of the film fails to satisfy the requirement (ii), as shown in FIG. 4.

The polyester film used in the process of this invention is prepared, for example, by stretching a substantially unoriented and amorphous polyester film monoaxially at a temperature between the glass transition point of the film and 100° C. at a stretch ratio of from 1.5:1 to 3:1, preferably 2.0:1 to 2.7:1, and post-heat treating it under conditions which will cause a shrinkage restriction of not more than 50%, preferably not more than 40%, but not less than 5%. Depending upon the combination of the stretch ratio, the stretching temperature, the post-heat treating conditions, and the shrinkage restriction, a film not possessing the properties (i) to (iv) might be formed. It is desirable therefore to predetermine the combination of these experimentally. The film so treated has been found to meet the requirement (i), and possess the peak characteristics meeting the requirement (ii), the heat shrinkage of the requirement (iii), and the density of the requirement (iv).

According to the process of this invention, a polyester shaped article of superior quality can be provided by heating a polyester film meeting the requirements (i) to (iv) to a temperature above its glass transition point but below 170° C., and deep-drawing the heated film using a mold heated at a temperature at least 10° C. higher than the temperature of the heated polyester film but below 200° C. The "deep-drawing using a mold" denotes all deep-drawing processes using a mold, such as straight forming, drape forming, matched mold forming, or pressure forming.

Polyester films which meet all of the requirements (i) through (iv) exhibit excellent thermoforming property, particularly vacuum forming processibility, and the shaped articles made therefrom possess excellent transparency and mechanical properties and good heat stability which has been heretofore considered to be incompatible with the aforesaid advantageous properties. That is, as already mentioned, when the lowly oriented polyester film is thermoformed according to the conventional practice, and thereafter the shaped articles are heated and crystallized in the mold to be imparted with heat stability, the shaped articles become opaque, and occasionally, brittle. In contrast thereto, the polyester film satisfying the requirements (i) through (iv) of the invention can be easily thermoformed, and concurrently possess a very unique and advantageous property that it is very rapidly crystallized upon contacting the heated mold, without becoming opaque or brittle.

The polyester film used in this invention is composed of substantially linear polyester containing at least 85 mol%, preferably at least 90 mol%, more preferably at least 95 mol%, of ethylene terephthalate units. As the other component which may be contained in the polyester in the amount of up to 15 mol%, preferably up to 10 mol%, more preferably up to 5 mol%, such aromatic or aliphatic dicarboxylic acids as isophthalic, naphthalenedicarboxylic, and adipic acids, and glycols such as propylene glycol, tetramethylene glycol, neopentyl glycol, and cyclohexane dimethanol, may be named.

In the specification, the term "film" is used in a generic sense, and includes material sometimes referred to as sheet with thickness up to about 3 mm, which is used for containers and other goods and for the sheet-formed packing.

The monoaxially oriented, post-heat treated polyester film used in this invention can be prepared, as aforesaid, by the process comprising monoaxially stretching a substantially unoriented, amorphous polyester film, preferably a polyester film having an intrinsic viscosity measured in ortho-chlorophenol at 30° C. of approximately 0.5 to 1.0, at a temperature higher than the glass transition point of said film, preferably from a point 2° – 3° C higher than the glass transition to 100° C., preferably to 90° C., to 1.5 to 3 times the original length of said film, preferably 2.0 to 2.7 times, and then post-heat treating the stretched film at a temperature ranging from the glass transition point, to preferably 100° C., particularly to 95° C., under conditions which allow a shrinkage restriction of not more than 50%, preferably not more than 30%.

The uniaxial stretching in this invention can be effected by any of the processes called "sheet process" by those who are skilled in the art. A simple process is to stretch an extruded and quenched film between two rollers with different peripheral speeds, the draw ratio being determined by the ratio of the peripheral speeds. The draw temperature of the film can be controlled by controlling the temperature of the feed roller, by controlling power of the heater which heats the film between the above mentioned rollers or by other means. Use of biaxial tentering-type stretch units is also satisfactory, since in this case the lateral dimension of the film can easily be controlled. A tentering-type stretch unit can be used in such a way as to stretch th film in the transverse direction to cause proper molecular orientation while keeping the film dimension in the machine direction substantially unchanged. In this case shrinkage in the post-heat treatment is also in the transverse direction. It is also possible to carry out the stretching in two or more stages.

The monoaxially oriented, post-heat treated polyester film used in this invention may also be formed by rolling the film with rolls. In that case, the substantially unoriented, amorphous polyester film is rolled to 2 – 3.5 times, preferably 2.3 – 3.2 times, the original length in a monoaxial direction, between at least a pair of rollers, at a temperature not higher than the glass transition point of the film, but preferably not lower than 30° C., and thereafter post-heat treated at a temperature not lower than the glass transition point, but preferably not higher than 100° C., particularly not higher than 95° C., under conditions which will cause a shrinkage restriction of not more that 50% in the film.

The term "shrinkage restriction", as used in the specification, is the value determined according to the equation below.

Shrinkage restriction = $(l - l1/l0 - l1) \times 100$ (%)

in which $l0$ denotes the length of the stretched or rolled film in the direction of stretching or rolling, $l1$ denotes the length of the stretched or rolled film in the same direction, which has been immersed in warm water at 90° C. for 5 seconds in the relaxed state and allowed to shrink freely, and $l$ denotes the length of the monoaxially oriented and post-heat treated film in the same direction.

In the former embodiment for making the monoaxially oriented, post-heat treated polyester film of the invention, if the stretch ratio is less than 1.5:1, the resulting film fails to meet the requirement (ii) on the X-ray pattern. Such a film crystallizes and becomes opaque in, for example, boiling water, and cannot provide transparent shaped articles. On the other hand, when the stretch ratio is higher than 3:1, the product film cannot satisfy the requirements (i), (ii) and (iv), and is inadequate for making deep-drawn shaped articles. Furthermore, if the stretching temperature is below the glass transition point of the film, the stretching tension inconveniently increases, and the stretched film is apt to show uneven thickness distribution. Again, when the stretching temperature is unduly high, for example, above 100° C., it becomes difficult to make a film satisfying the requirement (ii).

In the same embodiment, if a shrinkage restriction higher than the specified value is imposed on the film during the specified post-heat treatment, the resulting film cannot meet the requirement (ii), and can scarcely be thermoformed easily to provide highly transparent shaped articles.

When free shrinkage is allowed, the resulting film exhibits excellent transparency and thermoforming property, and does not turn cloudy when crystallized by shaping at elevated temperatures. However, it is usually difficult to control the film configuration under such free shrinkage conditions. In such a case, therefore, it is preferred to adopt such conditions as will allow a shrinkage of at most approximately 95% of the possible value. It is also possible to first allow free shrinkage, and immediately thereafter to stretch the film by several percents to improve the evenness of the film.

If the stretch ratio by rolling of the film is less than 2:1 in the latter embodiment, a film not satisfying the requirement (ii) is formed, which cannot provide shaped articles of high transparency, although it exhibits good thermoforming property. The shaped articles furthermore become conspicuously brittle when crystallized. If the film is rolled monoaxially to more than 3.5 times, on the other hand, a film not meeting the requirements (i), (ii) and (iv) is formed, which exhibits poor thermoforming property and is difficult of deep drawing.

In this latter embodiment, the rolling temperatures below the glass transition point of film are employed. When temperatures exceeding the upper limit are adopted, the product film cannot satisfy the requirement (ii), and it becomes difficult to crystallize the shaped articles of the film while retaining the good transparency and mechanical properties.

The post-heat treatment of the rolled film in the latter embodiment is effected in a similar manner to that described as to the first embodiment.

According to the invention, the post-heat treating time is not critical, but in order to prevent crystallization, it is as short as possible.

According to this invention, shaped articles such as containers and packaging materials for foods and other goods can be produced which have superior transparency, mechanical properties and heat stability. These shaped articles can be subjected to a sterilizing treatment by heating while they contain foods or other goods.

In the present invention, films meeting the requirements (i) to (iv) are heated to a temperature above their glass transition temperature, and then molded using a mold heated to a temperature at least 10° C. higher but below 200° C. Since the film to be used in this invention has a peculiar structure, it can be easily softened to the same extent as unoriented amorphous polyesters. In other words, the molding of the film used in this invention is as easy as in the case of amorphous unoriented polyesters.

The peculiar properties of the film used in this invention are exhibited especially conspicuously when it makes contact with a heated mold. The film used in this invention has an X-ray diffraction pattern of an amorphous polyester shown in FIG. 1. But when it crystallized upon contact with a heated mold, its latent structure shows itself as a peculiar molecular orientation to afford an X-ray diffraction pattern which meets the requirement (ii) above. For this reason, spherulites scarcely occur in the crystallization of the film of this invention, and the resulting shaped article is transparent despite its high degree of crystallinity. The film of this invention further had the advantage that when it is heated, an induction period for crystallization is short, and the crystallization proceeds within short periods of time. When an ordinary unoriented amorphous polyester is molded by the method of this invention, the softened film does not crystallize for some time after contact with a heated mold. If the film is released in this state, the resulting article is deformed or broken. Since the film used in this invention crystallizes rapidly, it can be released from the mold easily after being contacted with it for very short periods of time. This has an economic advantage of shortening the molding cycle.

Hereinafter the invention will be more specifically illustrated by Examples and Controls.

EXAMPLES 1 – 8 AND CONTROLS 1 – 9

An unoriented, amorphous polyethylene terephthalate film of 450 microns in thickness, which had been formed by melt-extrusion and had an intrinsic viscosity of 0.70 measured in orthochlorophenol at 30° C. (glass transition point: 70° C.), was stretched in the machine direction at the temperatures and the stretch ratios both indicated in Table 1 between a pair of roll stands without any restriction exerted on the laterial dimension, at a feed rate of 5 m/min. Then the film was post-heat treated in hot water, at the temperature and for the time both as indicated also in Table 1. The shrinkage restriction caused during the treatment in each run was as shown in the same Table.

The characteristics and thermoforming property of the resulting film and the transparency and heat stability of the shaped articles made of the film are shown in Table 1, together with the corresponding data of the films not satisfying the requirements of the present invention, which are given as Controls. Of the data given in Table 1, the thermoforming property of film, and transparency and heat stability of shaped articles were treated and evaluated by the below-specified methods.

a. Thermoforming Property

Figure 5:
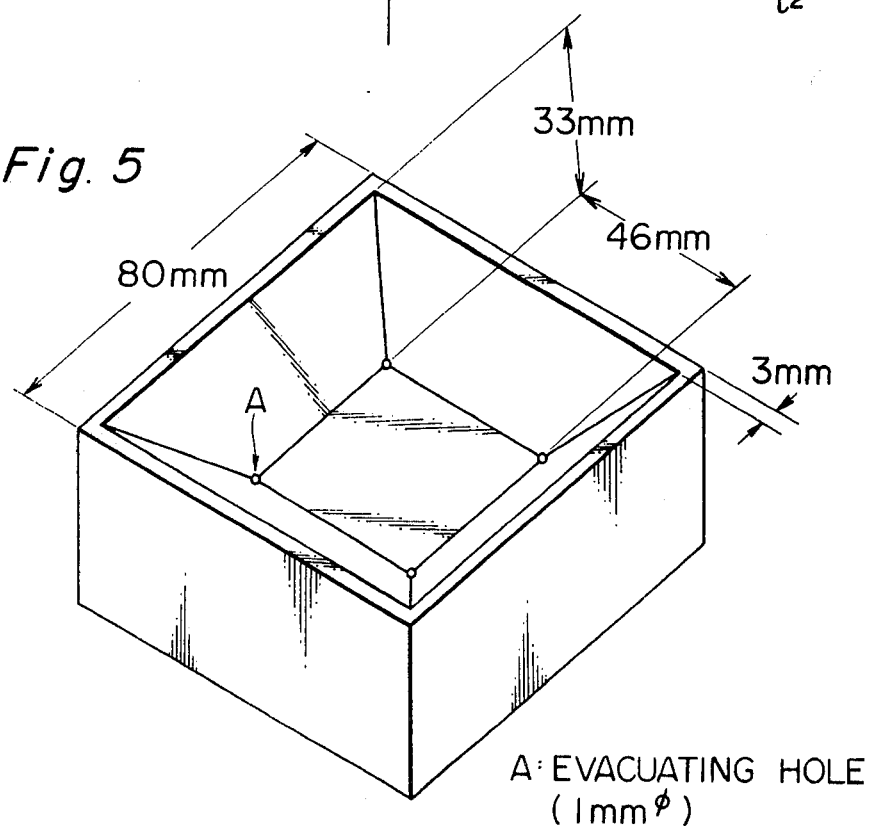
FIG. 5 is a schematic view in elevation of an aluminum mold used to measure thermoforming property.

The sample film was heated to 100° – 110° C. by an electric heater, and simultaneously with its softening, pressed onto a 160° C. aluminium mold with a quadrangular pyramidal cavity as shown in attached FIG. 5, and vacuum formed. The shaped article was held in the mold for 30 seconds to be heat-treated, and then released. The thermoforming property was graded in four classes as follows:

A: formed in perfect comformity with the mold without any trouble,
B: formed in nearly perfect comformity with the mold, but the molded articles had some defects at the vertex and edges,
C: imperfect shaping was observed also on the walls of the shaped article,
D: no sharp ridge was formed on the molded articles.

b. Transparency of Shaped Articles

A part of the sample article of which thickness was little changed from that of the film before the shaping, i.e., the upper part of the side wall, was cut out, and the percent transmission of the light of 500 mμ wavelength through the sample was measured by a spectrophotometer. As the standard specimen (100% transmission), a 400 μ-thick, unoriented amorphous polyethylene terephthalate film formed by melt-extrusion was used.

c. Heat Stability of Shaped Articles

The sample article was thrown into boiling water and boiled for 10 minutes.

The deformation that occurred in the shaped article as a result of this test was evaluated on the following scale.

A: No deformation occurred upon treatment with boiling water.
B: The dimension of the shaped article was maintained, but deformations such as warping occurred in the planar portion.
C: Dimensional change occurred as a result of heat shrinkage, and the corner portions became round.
D: Heat deformation occurred markedly all over the shaped article.

Table 1

| | Stretching | | Post-heat treatment | | | Monoaxially oriented, post-heat-treated film | | | | |
|---|---|---|---|---|---|---|---|---|---|---|
| Run No. | Temp. (° C.) | Stretch ratio (times) | Shrinkage restriction (%) | Temp. (° C.) | Time (sec) | (i) through view pattern of wide angle X-ray diffraction | (ii) pattern and central angle $\theta$ (degree) | | (iii) Shrinkage (%) | (iv) Density (g/ml) |
| Control 1 | 65 | 1.7 | 5 | 80 | 10 | diffuse halo | No 4-peak pattern | | 4 | 1.335 |
| Control 2 | 70 | 1.7 | 5 | 90 | 10 | " | " | | 4 | 1.335 |
| Example 1 | 75 | 2.0 | 10 | 85 | 10 | diffuse halo | 4-peak pattern | (160°) | 12 | 1.335 |
| Example 2 | 85 | 2.5 | 20 | 90 | 10 | " | " | (90°) | 18 | 1.335 |
| Example 3 | 80 | 2.8 | 30 | 100 | 5 | " | " | (35°) | 25 | 1.338 |
| Control 3 | 105 | 2.8 | 30 | 90 | 10 | diffuse halo | No 4-peak pattern | | 15 | 1.337 |
| Control 4 | 75 | 3.5 | 10 | 85 | 10 | not diffuse halo | " | | 5 | 1.342 |
| Control 5 | 75 | 1.5 | 10 | 79 | 30 | diffuse halo | " | | 12 | 1.335 |
| Control 6 | 75 | 1.5 | 10 | 105 | 5 | " | " | | 10 | 1.335 |
| Control 7 | 75 | 1.25 | 10 | 85 | 10 | " | " | | 2 | 1.335 |
| Control 8* | — | — | — | — | — | " | Ring-formed pattern | | 0 | 1.335 |
| Example 4 | 80 | 2.5 | 0 | 93 | 5 | diffuse halo | 4-peak pattern | (55°) | 0 | 1.336 |
| Example 5 | 80 | 2.5 | 15 | 93 | 5 | " | " | (50°) | 10 | 1.335 |

Table 1-continued

| | | | | | | | | | | |
|---|---|---|---|---|---|---|---|---|---|---|
| Example 6 | 80 | 2.5 | 25 | 93 | 5 | " | " | (47°) | 18 | 1.338 |
| Example 7 | 80 | 2.5 | 35 | 93 | 5 | " | " | (40°) | 25 | 1.338 |
| Example 8 | 80 | 2.5 | 40 | 93 | 5 | " | " | (35°) | 30 | 1.339 |
| Control 9 | 80 | 2.5 | 55 | 93 | 5 | not diffuse halo | 4-peak pattern | (20°) | 34 | 1.341 |

| Run No. | (a) Thermoforming test | (b) Transparency test | (c) Heat stability test |
|---|---|---|---|
| Control 1 | A | 65 | A |
| Control 2 | A | 69 | A |
| Example 1 | A | 85 | A |
| Example 2 | A | 95 | A |
| Example 3 | A | 96 | A |
| Control 3 | A | 67 | A |
| Control 4 | D | 98 | D |
| Control 5 | A | 67 | A |
| Control 6 | A | 65 | A |
| Control 7 | A | 60 | A |
| Control 8 | A | 55 | A |
| Example 4 | A | 94 | A |
| Example 5 | A | 95 | A |
| Example 6 | A | 97 | A |
| Example 7 | A | 97 | A |
| Example 8 | A | 95 | A |
| Control 9 | C | 96 | C |

*Neither stretched nor heat treated

EXAMPLE 9

An unoriented, amorphous polyethylene terephthalate film of 1.5 mm in thickness which had been formed by melt-extrusion process and had an intrinsic viscosity of 0.75 in orthochlorophenol of 30° C. and a glass transition point of 70° C. was stretched monoaxially in warm water at 75° C. at a rate of 200%/min. at a stretch ratio of 2.55:1, and then post-heat treated in hot water at 95° C. causing a restricted shrinkage. Thus the film length became 1.5 times the original length before the stretching. The film's through view pattern of wide angle X-ray diffraction was diffuse halo; there was a 4-peak pattern, and central angle $\theta$ was 50°; the shrinkage was 20%; the density was 1.336 g/ml.

The film was held between a pair of male and female molds, and molded at 105° C. to form a box shaped article of 5 cm × 10 cm × 3 cm in size. Then the molds were heated at 150° C. to heat treat the shaped article. The resulting shaped article exhibited dimensional stability even at 180° C., and fully retained transparency.

CONTROL 10

A 1.0-mm thick polyethylene terephthalate film formed by melt-extrusion process was molded and heat treated in the same manner as Example 9, without the monoaxial stretching and restricted shrinking treatments. The resulting shaped article exhibited dimensional stability at high temperatures (180° C.), but changed heavily opaque, and showed deterioration in mechanical properties.

EXAMPLES 10 – 20 AND CONTROLS 11 – 15

A 1250 μ-thick unoriented, amorphous polyethylene terephthalate film formed by melt-extrusion process, having an intrinsic viscosity of 0.68 in orthochlorophenol at 30° C. and a glass transition point of 71° C. was rolled in the machine direction at the rolling temperature and the rolling ratio both as indicated in Table 2. The rolling was effected with a pair of hot rolls of each 40 cm in circumference. During the rolling, little dimensional change in the lateral direction of the film was observed. The term "rolling ratio" used herein refers to the ratio of film dimensions in the machine direction after and before the rolling treatment.

Then the film was post-heat treated with the shrinkage restriction shown in Table 2, for the time and at the temperature also shown in the Table 2, in hot water. The characteristics and other properties of the films were as shown in Table 2, in the same manner as in Table 1.

Table 2

| | Rolling | | Post-heat treatment | | | Monoaxially oriented, post-heat-treated film | | | | |
|---|---|---|---|---|---|---|---|---|---|---|
| Run No. | Temp. (° C.) | Rolling ratio (times) | Shrinkage restriction (%) | Temp. (° C.) | Time (sec) | (i) through view pattern of wide angle X-ray diffraction | (ii) pattern and central angle $\theta$ (degree) | | (iii) Shrinkage (%) | (iv) Density (g/ml) |
| Example 10 | 65 | 3.3 | 10 | 90 | 5 | diffuse halo | 4-peak pattern | (55°) | 4 | 1.335 |
| Example 11 | 55 | 3.3 | 10 | 90 | 5 | " | " | (50°) | 6 | 1.335 |
| Example 12 | 50 | 2.5 | 20 | 85 | 10 | " | " | (120°) | 12 | 1.335 |
| Example 13 | 40 | 2.2 | 30 | 85 | 10 | " | " | (150°) | 18 | 1.338 |
| Control 11 | 40 | 4.0 | 30 | 85 | 10 | not diffuse halo | No 4-peak pattern | | 20 | 1.342 |
| Control 12 | 50 | 1.7 | 20 | 85 | 10 | diffuse halo | " | | 8 | 1.335 |
| Example 14 | 50 | 2.5 | 20 | 80 | 20 | diffuse halo | 4-peak pattern | (125°) | 12 | 1.336 |
| Example 15 | 50 | 2.5 | 20 | 105 | 3 | " | " | (130°) | 12 | 1.335 |
| Control 13 | 50 | 4.0 | 20 | 85 | 10 | not diffuse halo | No 4-peak pattern | | 18 | 1.340 |
| Control 14* | — | — | — | — | — | diffuse halo | Ring-formed pattern | | 0 | 1.335 |
| Example 16 | 55 | 3 | 0 | 90 | 5 | diffuse halo | 4-peak pattern | (70°) | 0 | 1.335 |
| Example 17 | 55 | 3 | 15 | 90 | 5 | " | " | (65°) | 6 | 1.336 |
| Example 18 | 55 | 3 | 25 | 90 | 5 | " | " | (60°) | 12 | 1.336 |
| Example 19 | 55 | 3 | 30 | 90 | 5 | " | " | (45°) | 15 | 1.337 |
| Example 20 | 55 | 3 | 40 | 90 | 5 | " | " | (35°) | 22 | 1.337 |
| Control 15 | 55 | 3 | 55 | 90 | 5 | not diffuse halo | 4-peak pattern | (20°) | 30 | 1.338 |

| Run No. | (a) Thermoforming test | (b) Transparency test | (c) Heat stability test |
|---|---|---|---|
| Example 10 | A | 75 | A |

Table 2-continued

| | | | |
|---|---|---|---|
| Example 11 | A | 78 | A |
| Example 12 | A | 70 | A |
| Example 13 | A | 63 | A |
| Control 11 | D | 82 | D |
| Control 12 | A | 55 | A |
| Example 14 | A | 75 | A |
| Example 15 | A | 73 | A |
| Control 13 | D | 80 | D |
| Control 14 | A | 35 | A |
| Example 16 | A | 77 | A |
| Example 17 | A | 78 | A |
| Example 18 | B | 75 | A |
| Example 19 | B | 75 | A |
| Example 20 | B | 78 | A |
| Control 15 | C | 75 | C |

*Neither stretched nor heat treated

EXAMPLE 21 AND CONTROLS 16 TO 19

An unoriented, amorphous polyethylene terephthalate film of 300 microns in thickness which had been formed by a melt-extrusion process and had an intrinsic viscosity of 0.70 in ortho-chlorophenol at 30° C. and a glass transition point of 70° C. was stretched monoaxially at 80° C. to 2.5 times the original length, and post-heat treated at 95° C. while allowing a restricted shrinkage. As a result, the length of the film decreased to ½ of that of the stretched film, and its thickness became twice as large as that of the stretched film. The through-view pattern of wide angle X-ray diffraction of the resulting film was diffuse halo. After the heat treatment under the specified conditions, it showed a 4-peak pattern, and the central angle ($\theta$) was 65°. It has a shrinkage of 15%, and a density of 1.335. The properties of the film obtained are shown in Table 3.

For comparison, the film was stretched at 80° C. in orthogonal directions (at a stretch ratio $X_1$ in the machine direction and at a stretch ratio $X_2$ in the transverse direction as shown in Table 3), and then, heat-treated at 95° C. while allowing a restricted shrinkage (1/$Y_1$ in the machine direction, and 1/$Y_2$ in the transverse direction as shown in Table 3). The results are also shown in Table 3.

Table 3

| Runs | Stretch ratio (times) | | Shrinkage by heat-treatment | | | | (a) | (b) | (c) |
|---|---|---|---|---|---|---|---|---|---|
| | $X_1$ | $X_2$ | Decrease in film thickness | 1/$Y_1$ | 1/$Y_2$ | Increase in film thickness | Thermo-forming test | Trans-parency test | Heat stability test |
| Example 21 | 2.5 | 1.0 | 1/2.5 | 1/2.0 | 1/1.0 | 2.0 | A | 98 | A |
| Control 16 | 2.0 | 2.0 | 1/4.0 | 1/1.4 | 1/1.4 | 1.96 | C | 94 | B |
| Control 17 | 2.4 | 2.0 | 1/4.8 | 1/1.4 | 1/1.4 | 1.96 | C | 97 | C |
| Control 18 | 2.5 | 2.5 | 1/6.25 | 1/1.2 | 1/1.2 | 1.44 | D | 98 | D |
| Control 19 | 3.0 | 3.0 | 1/9.0 | 1/1.4 | 1/1.4 | 1.96 | D | 98 | D |

CONTROL 20

An unoriented, amorphous polyethylene terephthalate film having a thickness of 400 microns and an intrinsic viscosity in ortho-chlorophenol at 30° C. of 0.65 was heat-treated at the varying temperatures shown in Table 4 to form films having varying degrees of crystallinity. The properties of the films are shown in Table 4.

Table 4

| Temperature of heat treatment (° C.) | Density at 25° C (g/cm³) | (a) Thermo-forming test | (b) Trans-parency test | (c) Heat stability test |
|---|---|---|---|---|
| Non-treated | 1.335 | A | 55 | A |
| 100 | 1.336 | A | 56 | A |
| 120 | 1.340 | B | 55 | B |
| 120 | 1.342 | C | 53 | B |
| 130 | 1.350 | D | 56 | C |
| 130 | 1.356 | D | 56 | C |

What I claim is:

1. A process for producing a polyester shaped article comprising heating a polyester film to a temperature above its glass transition point but below 170° C and deep-drawing the preheated polyester film using a mold heated at a temperature at least 10° C higher than the temperature of the heated polyester film but below 200° C, wherein the starting polyester film is a monoaxially oriented, post-heat treated polyester film which contains at least 85 mol% of ethylene terephthalate units and has the following properties (i) to (iv):

i. the through-view pattern of wide angle X-ray diffraction of the film is diffuse halo, ii. when the film is heated, while maintained at a fixed width and length, from room temperature to 160° C at a rate of 10° C/minute, and then at 160° for 30 minutes, the azimuthal scan of (100) diffraction in the through-view pattern of the film shows four peaks, and when measured with the monoaxially oriented direction of the film being caused to correspond with the meridian direction of the pattern, two pairs of the above peaks confronting each other across the equator, connected by straight lines passing through the center of the pattern, form a central angle ($\theta$) of at least 35° but less than 180° including the equator line, iii. when the film is dipped in hot water at 90° C for 10 seconds, the shrinkage of the film in the monoaxially oriented direction is not more than 25% based on the original length of the film before the dipping, and iv. the film has a density of not more than 1.340 g/ml at 25° C.

2. The process of claim 1 wherein the central angle ($\theta$) is about 45° to 150°.

* * * * *

UNITED STATES PATENT AND TRADEMARK OFFICE
CERTIFICATE OF CORRECTION

PATENT NO. : 4,073,857
DATED : February 14, 1978
INVENTOR(S) : Arakawa

It is certified that error appears in the above-identified patent and that said Letters Patent are hereby corrected as shown below:

Item [57], line 22, delete "1.340 g/ml", insert
--1.340 g/mℓ--.

Claim 1, line 31, delete "1.340 g/ml", insert
--1.340 g/mℓ--.

Signed and Sealed this

Twentieth Day of June 1978

[SEAL]

Attest:

RUTH C. MASON
Attesting Officer

DONALD W. BANNER
Commissioner of Patents and Trademarks